United States Patent
Bae et al.

(10) Patent No.: US 7,401,265 B2
(45) Date of Patent: Jul. 15, 2008

(54) SCALABLE METHOD OF CONTINUOUS MONITORING THE REMOTELY ACCESSIBLE RESOURCES AGAINST THE NODE FAILURES FOR VERY LARGE CLUSTERS

(75) Inventors: Myung M Bae, Pleasant Valley, NY (US); Ramendra K Sahoo, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/835,892

(22) Filed: Aug. 8, 2007

(65) Prior Publication Data

US 2007/0277058 A1  Nov. 29, 2007

Related U.S. Application Data

(63) Continuation of application No. 11/456,585, filed on Jul. 11, 2006, now Pat. No. 7,296,191, which is a continuation of application No. 10/365,193, filed on Feb. 12, 2003, now Pat. No. 7,137,040.

(51) Int. Cl.
 *G06F 11/00* (2006.01)
(52) U.S. Cl. ......................................... 714/47; 709/225
(58) Field of Classification Search .................... 714/47, 714/48, 49, 56, 39, 43
See application file for complete search history.

(56) References Cited

U.S. PATENT DOCUMENTS 5,301,311 A 4/1994 Fushimi et al. ............. 395/575
6,094,680 A 7/2000 Hokanson .................... 709/223
6,138,251 A 10/2000 Murphy et al. ................ 714/41
6,353,898 B1 3/2002 Wipfel et al. .................. 714/48
6,393,485 B1 5/2002 Chao et al. .................... 709/231
6,438,705 B1 8/2002 Chao et al. ..................... 714/4
6,738,345 B1 5/2004 Williamson ................. 370/217
6,944,786 B2 9/2005 Kashyap ........................ 714/4
6,971,044 B2 11/2005 Geng et al. .................... 714/11
7,203,748 B2* 4/2007 Hare et al. ................... 709/224
7,296,191 B2* 11/2007 Bae et al. ....................... 714/47
2002/0049845 A1 4/2002 Sreenivasan et al. ........ 709/226
2002/0073354 A1 6/2002 Schroiff et al. ................. 714/4
2002/0198996 A1 12/2002 Sreenivasan et al. ........ 709/226

(Continued)

FOREIGN PATENT DOCUMENTS

EP  1 024 428 A2  8/2000

(Continued)

*Primary Examiner*—Nadeem Iqbal
(74) *Attorney, Agent, or Firm*—Geraldine Monteleone, Esq.; Heslin Rothenberg Farley & Mesiti P.C.

(57) ABSTRACT

The notion of controlling, using and monitoring remote resources in a distributed data processing system through the use of proxy resource managers and agents is extended to provide failover capability so that resource coverage is preserved and maintained even in the event of either temporary or longer duration node failure. Mechanisms are provided for consistent determination of resource status. Mechanisms are also provided which facilitate the joining of nodes to a group of nodes while still preserving remote resource operations. Additional mechanisms are also provided for the return of remote resource management to the control of a previously failed, but now recovered node, even if the failure had resulted in a node reset.

1 Claim, 4 Drawing Sheets

U.S. PATENT DOCUMENTS

| | | | |
|---|---|---|---|
| 2003/0009556 A1 | 1/2003 | Motobayashi et al. | 709/224 |
| 2003/0158936 A1* | 8/2003 | Knop et al. | 709/224 |
| 2004/0039816 A1* | 2/2004 | Bae et al. | 709/225 |
| 2004/0122944 A1* | 6/2004 | Poirot et al. | 709/224 |
| 2004/0123183 A1 | 6/2004 | Tripathi et al. | 714/31 |

FOREIGN PATENT DOCUMENTS

| | | |
|---|---|---|
| WO | WO 01/35278 A1 | 5/2001 |

\* cited by examiner

SCALABLE METHOD OF CONTINUOUS MONITORING THE REMOTELY ACCESSIBLE RESOURCES AGAINST THE NODE FAILURES FOR VERY LARGE CLUSTERS

CROSS-REFERENCE TO RELATED APPLICATIONS

This application is a continuation of U.S. patent application Ser. No. 11/456,585 filed Jul. 11, 2006 now U.S. Pat. No. 7,296,191, which is a continuation of U.S. Patent Application No. 10/365,193 filed Feb. 12, 2003, now U.S. Pat. No. 7,137,040 granted Nov. 14, 2006, the entirety of which are both hereby incorporated herein by reference.

BACKGROUND OF THE INVENTION

The present invention is directed to distributed, multi-node data processing systems. More particularly, the present invention is directed to a mechanism for managing a plurality of diverse resources whose presence on remote external data processing nodes can lead to situations in which their status is either changed, unknown or not well defined. Even more particularly, the present invention is directed to a scalable resource management method for resources on remote nodes in a manner which is tolerant of management node failures and which is especially useful in systems having a very large number of nodes.

The present invention is an improvement upon a previously submitted patent application (Ser. No. 10/227,254, filed Aug. 23, 2002) titled "A Monitoring Method of the Remotely Accessible Resources to Provide the Persistent and Consistent Resource States," which provides a method for continuously monitoring and controlling operations in a distributed, multi-node data processing system against the possibility of a failure at one of the monitoring nodes. The present invention is an enhancement of the methods described previously in that it provides protection against failure by providing a failover mechanism for the resource manager's functionality to other nodes in the system.

In distributed systems, many physical and logical entities are located throughout the nodes in the system, including nodes that are best characterized as being remote nodes that may or not be closely coupled to other nodes in the system. This is one of the typical characteristics found in distributed systems. In the present context, these physical and logical entities are called resources in the present context. The term "resource" is used broadly in the present description to refer to software as well as to hardware entities. Examples of such resources include ethernet device eth0 on node 14, the database table "Customers," IP address 9.117.7.21, etc. From these few examples it is thus seen that the term "resources" is intended to refer to a number of highly, disparate entities found in distributed, multi-node data processing systems. Each resource, however, has at least one attribute which at least partially defines a characteristic of the resource. Moreover, some of the attributes are reflected through the status or condition of the resources. As an example, a network ethernet device typically includes attributes like name (for example, eth0), OpState (for example, Up, Down, Failed, etc.), its address (for example, 9.117.7.21), etc. Thus name, OpState, and address are referred to as resource attributes. The resource attributes which reflect the status of the resources are categorized as dynamic attributes (like OpState above).

Because these resources provide services to other components of the distributed data processing system (for example, to system management tools or to user applications, etc.), these resources need to be monitored and/or controlled at the system level by an entity that is typically referred to, in the present description, as the "Resource Manager Infrastructure" or "RMI." Most RMIs assume that the resources as described earlier and that the RMIs are contained or confined to the same node. However, the current assumptions of the same node resources and RMIs do not hold if certain systems have different types of nodes which may or may not have both the resources and RMIs because of software, hardware and/or architectural limitations. As used herein, the term Resource Manager Infrastructure refers to a system of software components comprising subsystems which perform monitoring, querying, modifying, and controlling functions for resources within a cluster of data processing nodes. The subsystems typically include shared components that are used by cluster resource managers for handling common activities like communication between nodes, registration of the resources, etc. RMIs also include resource managers (RMs) which provide methods for operating on a resource; these operations include monitoring the state of the resource and controlling the resource configuration and the behavior of the resource. Typically any given RM deals with a set of similar types of resources.

The previously submitted application, referred to above, provides a mechanism to monitor and control the remotely accessible resources which exist on the non-RMI nodes through the concept of proxy resource manager and proxy resource agent, and also provides the persistent and consistent dynamic attributes even after the proxy resource manager fails and is restarted. However, in the case of a (relatively) permanent failure of the proxy resource manager or its node, the remote resources cannot be continuously monitored or controlled, even if the remote resources are still up and active.

The present invention provides continuous services for monitoring and controlling those remote resources even in the event of a failure of the proxy node (which runs the proxy resource managers) in addition to providing consistent and persistent resource attributes.

Furthermore, if the size of the distributed data processing cluster which is desirably subject to resource management is large (for example, one-thousand nodes or more), a failover system should also be adequately scalable, particularly when messages are to be exchanged amongst all of the nodes in a large system. The present invention proposes an efficient mechanism which provides failover resource management functionality to support large clusters of nodes.

Use of the present invention provides the following representative advantages:

(1) The proxy resource manager (PxRM) is transparently moved to other nodes so that the remote resources are continuously monitored and controlled without disruption.
(2) When the failed node is repaired, the proxy resource manager is moveable back to the originally failed node.
(3) The method is efficient and scalable in terms of the load balancing, the recovery speed, and the number of nodes.
(4) Therefore, in combination with the previously mentioned inventive method provided in the above-mentioned application for "A Monitoring Method of the Remotely Accessible Resources to Provide the Persistent and Consistent Resource States," remote resources herein are persistently monitored so as to maintain consistent attribute values, against any failures, which includes the proxy resource manager, or Resource Management Infrastructure (RMI) subsystem, and/or other nodes, in a scalable and efficient manner.

SUMMARY OF THE INVENTION

In accordance with a first preferred embodiment of the present invention a method and system are provided for managing a remotely accessible resource in a multi-node, distributed data processing system. A proxy resource manager is run on a plurality of nodes in the distributed system and, in persistent storage devices coupled to respective ones of these nodes, a sequential resource generation number (RGN) (or equivalent identifier) is stored. The RGN is associated with the remote resource. A proxy resource agent is run on one or more other (remote) nodes. A local version of the RGN is maintained on the remote node and is associated with a specific resource attached to that node. Upon the resetting or restarting of one of the system nodes the RGN is incremented. The RGN is also incremented, via the proxy resource agent, upon changes in the status of the resource. The remote and system RGN's are compared to insure consistency of operations based on the status of the remote resource.

In a second preferred embodiment of the present invention a method is provided for managing a remotely accessible resource in a multi-node, distributed data processing system. In this method, processing a request for a node to join a group of nodes includes providing to the joining node failover coverage information for the group in which the membership is sought and by providing, to the joining node, status information for remote resources which are indicated by the failover coverage information as ones being monitored by the (failover) group. This embodiment is also considered to be a method in which a node joins a group of cooperating nodes.

In a third preferred embodiment of the present invention, a mechanism is provided in which the proxy resource manager used above is effectively moved from a failed node to a non-failed node to provide increased operational continuity. In this method it is first determined that a node has failed and that the failed node was managing a remote resource. At one of the nodes in a predefined failover group, a node in the failover group is selected to take over management of the remote resource. Status information pertinent to a resource present on a remote node is then determined using pre-established coverage information which is used to communicate with a proxy resource agent at the remote node so as to determine the current status for the subject resource. A proxy resource manager is then established on the selected node to be the current manager of the remotely located resource. To carry out this function the proxy manager uses the previously determined current remote resource status.

In a fourth preferred embodiment of the present invention, a mechanism is provided for returning the proxy resource manager to a failed node after it has been restarted or after its operational status has returned to normal. In this method information indicating that the previously failed node is now functioning is provided both to the failed node and to another node in a failover group of nodes. This is provided by Group Services. Next, at the previously failed node it is determined that remote resource coverage is currently being handled by another node in the failover group. At the request of the previously failed node current coverage information is sent to the previously failed node from the node in the failover group. At this point, active management of the remote resource is changed from the failover group node to the previously failed but now recovered node.

Accordingly, it is an object of the present invention to manage a wide variety of computer resources over a period of time even when those resources are present on remote nodes of a distributed data processing system.

It is also an object of the present invention to track and maintain status information relevant to resources located on remote data processing nodes.

It is a further object of the present invention to provide a mechanism for intelligent, autonomous operation of data processing systems.

It is yet another object of the present invention to provide a mechanism in which failure of a node or failure of communications with a node is an eventuality in which remote resource status is still maintained and made available to non-failed portions of the system.

It is yet another object of the present invention to provide failover capabilities in a distributed data processing system.

It is also an object of the present invention to provide a degree of load balancing by selecting a node in a failover group based on the currently assigned number of remote resources it is assigned to manage.

It is yet another object of the present invention to provide a mechanism in which a failed node which has recovered is able to recover its role as remote resource manager for the other nodes in the system.

It is still another object of the present invention to enhance the reliability and availability of distributed data processing systems.

Lastly, but not limited hereto, it is object of the present invention to improve the performance and efficiency of distributed data processing systems and to further their autonomous operation.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

In preferred embodiments of the present invention, an resource management infrastructure, such as RSCT/RMC, is assumed to be present. The RSCT/RMC infrastructure includes a component for Resource Monitoring and Control (RMC). In general, a RMI on a node includes many Resource Managers (RMs), one RMC and other RSCT subsystem components and multiple resource managers on a node. RSCT (Reliable Scalable Cluster Technology) is a publicly available program product marketed and sold by the assignee of the present invention. The RMC subsystem provides a framework for managing and for manipulating resources within a data processing system or within a cluster of nodes. This framework allows a process on any node of the cluster to perform an operation on one or more resources elsewhere in the cluster.

A client program specifies an operation to be performed and the resources it has to apply through a programming interface called RMCAPI. The RMC subsystem then determines the node or nodes that contain the resources to be operated on, transmits the requested operation to those nodes, and then invokes the appropriate code on those nodes to perform the operation against the resources. The code that is invoked to perform the operation is contained in a process called a resource manager.

Figure 1:
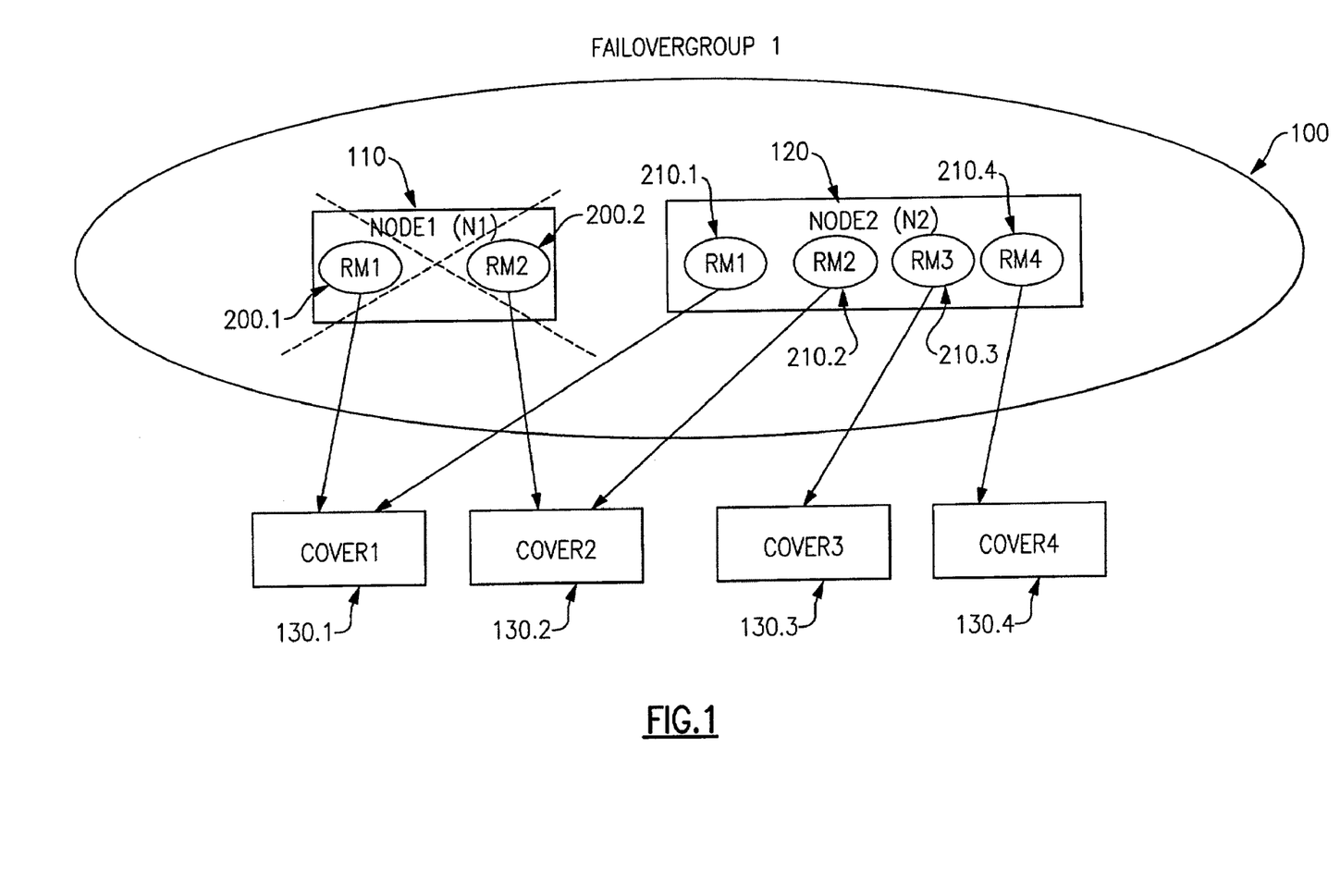
FIG. 1 is a block diagram illustrating the operating environment in which it is employed and the overall structure of operation for the present invention.

A resource manager (see reference numerals 200.1, 200.2, 210.1, 210.2, 210.3 and 210.4 in FIG. 1) is a process that maps resource type abstractions into the calls and commands for one or more specific types of resources. A resource manager is capable of executing on every node of the cluster where its resources could exist. The instances of the resource manager process running on various nodes work in concert to provide the abstractions as described above.

Figure 4:
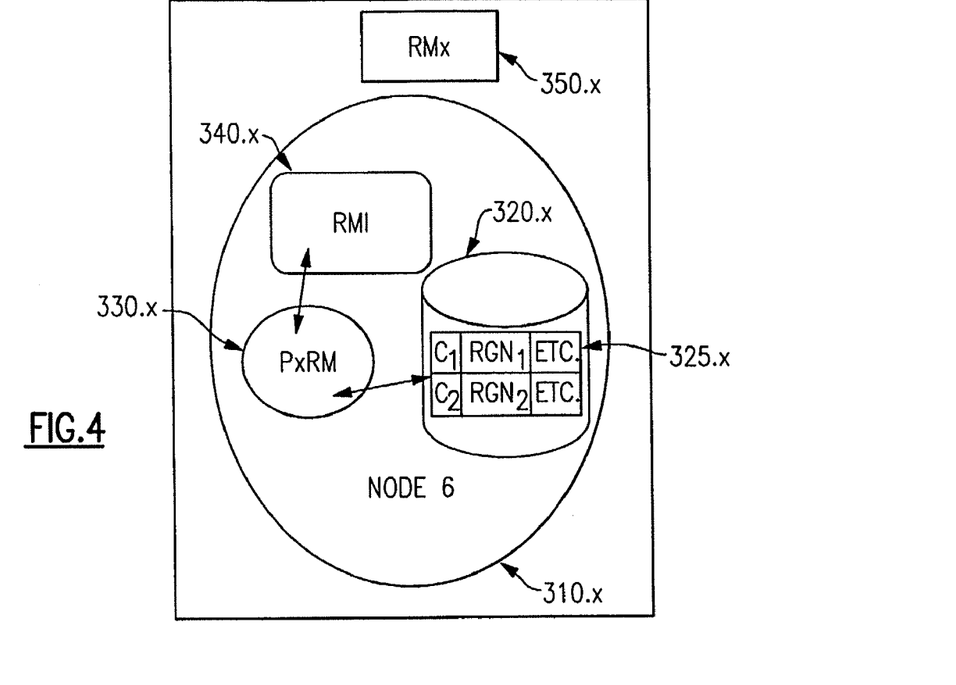
FIG. 4 shows an enlarged portion of a portion of FIG. 2 illustrating the role of the proxy resource manager, PxRM, and its interactions with other portions of the system.
Figure 5:
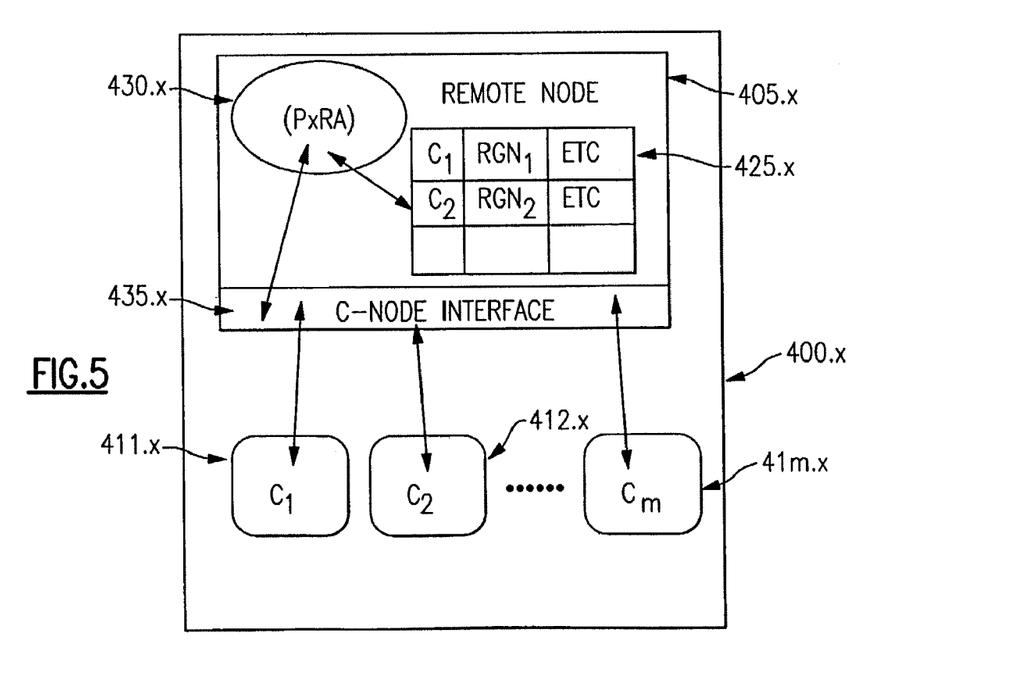
FIG. 5 shows an enlarged portion of FIG. 2 illustrating the role of the proxy resource agent, PxRA, and its interactions with other portions of the remote portion of the distributed data processing system.

To monitor and control the remote resources located outside the RMI nodes, a resource manager, called PxRM (see reference numeral 330.x in FIG. 4), is placed on a RMI node (see reference numerals 110 and 120 in FIG. 2), and its peer agent, called PxRA (see reference numeral 430.x in FIG. 5), is placed on an external entity (that is, on a non-RMI node or on a device such as node 405.x shown in FIG. 5).

Figure 2:
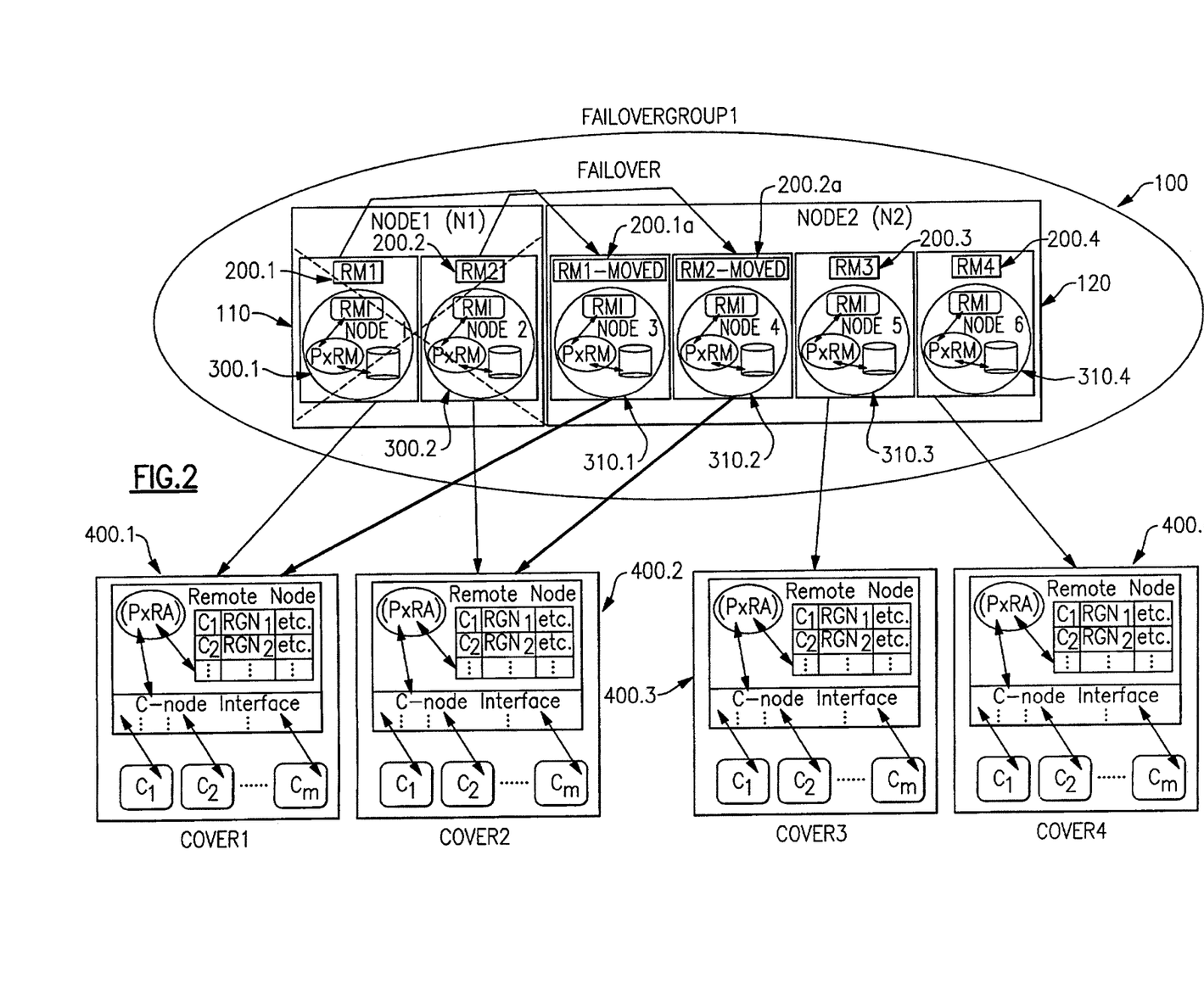
FIG. 2 is a more detailed block diagram similar to FIG. 1 but more particularly illustrating the status of various components of the present invention that occur during typical operation and even more particularly illustrating the structure of data maintained on remote nodes.

PxRM 330.x (see FIG. 4) is a resource manager which connects to both RMC subsystem and to PxRA 430.x (as indicated by arrows extending downward from Failover-Group1 100 in FIGS. 1 and 2). The resources used by PxRMs 330.x are the representations of the resources from the PxRAs. PxRAs 430.x can be anything—an intermediate process, or service routine—as long as it keeps tracks of the resources and reports the changes to the current PxRM.

To provide persistent and consistent attribute values of the resources, the proxy resource manager is provided with status from the PxRAs, even after the PxRM is restarted. In order to handle this activity, an indicator called Resource Generation Number (RGN) is provided. Each resource on a remote node has a RGN. The RGN is changed properly and traced by both the PxRM and its PxRA so that the PxRM knows the current status of the resource attributes. The RGN is described more particularly in the aforementioned patent application.

Here, a RGN is unique in time per for each resource and is incremented monotonically. In other words, two RGNs are different if they are created at different times. This property guarantees there is no ambiguity in state when determining whether an RGN has been changed or not. Hence an appropriate RGN may simply be implemented as a time stamp.

The present invention provides a mechanism in which resource managers operate together cooperatively in a failover group. A failover group is a set of nodes in which there is contained a consistent set of data pertaining to all of the resources that that node may be called upon to handle. In order to provide a failover capability, the present invention utilizes a software service such as that provided by the Group Services product (a program marketed and sold by International Business Machines, Inc., the assignee of the present invention). Using facilities provided by Group Services, each proxy resource manager reliably detects the failure of other proxy resource managers and coordinates the actions between the remote nodes. Furthermore, to accommodate large clusters of nodes, the nodes herein are grouped, as mentioned above. Failover only happens between nodes in the same failover node group. This is useful not only to provide efficiency and scalability, but also to prevent an excessive chain of failovers from occurring. For example, in some systems, electrical power and many internal connections are confined to a particular group of nodes. Thus, failover to the nodes in another group is not desirable. For example, in the case of a power failure affecting a plurality of nodes, failover to other nodes within the same power grouping is useless. Similar grouping of nodes is also be applicable to clusters of general computers. Therefore, each node is preferably assigned to a node group using Group Services' failover group designation, wherein it the group of nodes is referred to "FailoverGroup<#>", where <#> indicates a node group number.

Note also that each PxRM is a resource manager which represents the resources of PxRA as well as the member of one of failover group. The discussion below thus focuses primarily on how the failover is performed, particularly as related to activity and reaction in the defined failover group.

Assumptions

In the discussion which follows below, certain understandings are considered first so as to place the invention in the proper context and to better assure the fullest comprehension of its structure and operation. In particular, it is assumed that: (1) a cluster consists of multiple nodes which run resource managers (RMs); (2) a set of resources at a particular location (for example, a midplane or a frame) is referred to as a coverage, with the resources in a whole system being partitioned into multiple coverages and with each coverage being identified using an unique identifier (ID) (see reference numerals 130.1, 130.2, 130.3 and 130.4 in FIG. 1). (For example, the unique ID can be a frame number. In other words, an unique ID identifies a set of particular locations which host the resources.); (3) for simplicity, in the present description, each RM entity is limited to having responsibility for one coverage (However, it is noted that in more general embodiments of the present invention actual RM processes can have multiple RM entities (that is, threads) for multiple coverages. Accordingly, the identifier of a coverage is used herein interchangeably with its associated RM's ID.); (4) each node may run one or more RMs which also represent one or more coverages (130.1-130.4). (Thus, combining item (4) together with the item (3) above, it is noted that a single node (see nodes 110 and 120 in FIG. 1) may host multiple RMs (reference numerals 210.1-210.4 in FIG. 1) or may host one RM with multiple threads to cover multiple coverages depending on the implementation.) (5) There is a mapping configuration that exists between Coverages (or RMs), FailoverGroup 100, and nodes (110 and 120, for example, in FIG. 1). (With this configuration, a RM "knows" which nodes can be used for the failover as well as which coverage should be initially assigned to each node. In other words, the node used during the run time of each RM may be different than the node which is in the configuration. It also allows multiple RMs to be present within a single node.) (6) Group Services (or a program providing a similar function in multi-node environments) is used for fault-tolerant and high available cluster-wide group membership and synchronization services. Using this service, each node which hosts RMs reliably "knows" the other node's status as well as maintains current active mapping information between the nodes and the working coverage.

TABLE I

Exemplary Configuration Mapping

| COVERAGE | FAILOVER GROUP | NODE IDS (CONFIGURED) |
|---|---|---|
| Cover#1 | FailoverGroup#1 | #1 (ref. no. 110) |
| Cover#2 | FailoverGroup#1 | #1 (ref. no. 110) |
| Cover#3 | FailoverGroup#1 | #2 (ref. no. 120) |
| Cover#4 | FailoverGroup#1 | #2 (ref. no. 120) |
| Cover#10 | FailoverGroup#2 | #3 |
| Cover#20 | FailoverGroup#2 | #3 |
| Cover#30 | FailoverGroup#2 | #4 |
| Cover#40 | FailoverGroup#2 | #4 |

Forming Failover Groups

When each RM on a node is started, each RM reads the configuration and tries to join the configured FailoverGroup. If the join request is accepted, then the joining RM initiates contacting the remote resources (see 411.x, 412.x, ..., 41m.x in FIG. 5 and at a higher level in FIG. 4; also labeled $C_1$, $C_2, \ldots, C_m$ in FIGS. 4 and 5) for the coverages. If the joining operation fails due to the other already joined members already handling the intended coverage, the RM subscribes to the group to monitor the group activity. The joining node becomes a member of the group and the members are listed in a membership list. Furthermore, as used herein, the term "subscribe" refers to the operation that a joining node performs to ascertain what other nodes are in the node group. The reason for subscribing is to monitor which nodes are joining or failing.

Accordingly, joining a FailoverGroup (such as FailoverGroup1 100 in FIGS. 1 and 2) means that the RM becomes active to cover the intended resources. Each FailoverGroup membership includes the list of MemberIDs which represent the list of Resource Managers. A MemberID is a combination of the node number and a number which is provided by Group Services. For example, the case discussed above results in the following memberships (before any failovers; see FIG. 2):

FailoverGroup#1={<N1, Cover>, <N1, Cover2>, <N2, Cover3>, <N2, Cover4}

FailoverGroup#2={<N3, Cover10>, <N3, Cover20>, <N4, Cover30>, <N4, Cover40}

To determine this, a RM joins associated Failover-Group 100 that it belongs to, and then receives the current RM membership which lists the active nodes. Through Group Services facility, it obtains the currently handled coverage by the other nodes to the requesting node N2 and then updates the current mapping information. As an example, if the newly added RM is on node N2 and no nodes take care of the coverage of Cover3 (130.3 in FIG. 1) and Cover4 (130.4 in FIG. 1), the current membership and the active coverage of the failover looks like the following:

Currentmembership={N1}

Active coverage={(N1, Cover1), (N1, Cover2)}

After determining whether the intended coverage is not being failed-over to the other nodes, the RM starts to cover the configured coverage and adds the mapping (N2, Cover3), (N2, Cover4) to the current active mapping. The subsequent mapping is then the following:

FailoverGroup1={(N1, Cover1), (N1, Cover2), (N2, Cover3), (N2, Cover4)}

FailoverGroup2={(N3, Cover10), (N3, Cover20), (N4, Cover30), (N4, Cover40)}

On the other hand, if the intended coverage is already being handled by the other nodes and there is a requirement to move back to the configuration nodes, the RM contacts the already-covering node, say $N_x$. Upon the request, node $N_x$ copies the current coverage-related information to the requesting node N2 and then updates the current mapping information.

Monitoring/Controlling Resources

Monitoring and control of the resources is done in the same way as described in the patent application referred to above (Ser. No. 10/227,254, filed Aug. 23, 2002 titled "A Monitoring Method of the Remotely Accessible Resources to Provide the Persistent and Consistent Resource States").

Detecting the Failure of a RM and Taking Over the Failed Coverage

When a node, say node N1, fails, Group Services notifies the other nodes about the failure of node N1. Upon receipt of the failure notification, one of the other nodes in the same Failover-Group takes over the coverage. The selection of the node is based on the load and the node number if the loads are same, where the load is denoted as the number of coverages which are designated as being handled by each node. The selection may also be done locally without communication between nodes.

In the above example (FIG. 1), the load for node N2, "load(N2)" is 2, and node N2 takes over the coverages Cover1 and Cover2 because the load of N2 is the smallest load amongst the nodes in the same FailoverGroup (FailoverGroup1). Since node N1 is considered as being the node which has failed, node N2 cannot obtain current coverage information from node N1. In this circumstance, active coverage information for Cover1 and Cover2 is reconstructed by contacting the covering PxRM which is currently responsible for the coverage. Reconstruction is reliably carried out using the persistent resource monitoring method described in the above-identified patent application.

Recovering the Failed Coverage (Fallback)

Optionally, the present process also provides fallback of coverage to the original node when the original node becomes available. For example, in FIG. 1, if node N1 becomes available again after the failure, the coverages, Cover1 and Cover2, may be moved back to node N1 again in the following way.

(1) At the time N1 (110) becomes available again, Group Services provides notification of this event to node N2 (120) as well as N1.

(2) When N1 tries to join the failover-group as described in "Forming a failover group," node N1 discovers that the coverage for N1 has failed-over to N2 by reading the group membership list which is provided and maintained by Group Services. This list identifies RMs present on the nodes in the group (such as RMs 200.1a, 200.1b, 200.3 and 200.4, as seen in FIG. 2, which are present on nodes identified as Node3, Node4, Node5 and Node6, respectively).

(3) On the recognition of this situation, N1 issues a request for node N2 to send the current Cover1 and Cover2's information. This is done through the Group Services' messaging services.

(4) Upon receiving this information, node N1 joins the membership for Cover1 and Cover2 and N2 releases the membership for Cover1 and Cover2.

(5) Upon successful change of membership for Cover1 and Cover2, the coverages are now moved back to the original node.

Figure 3:
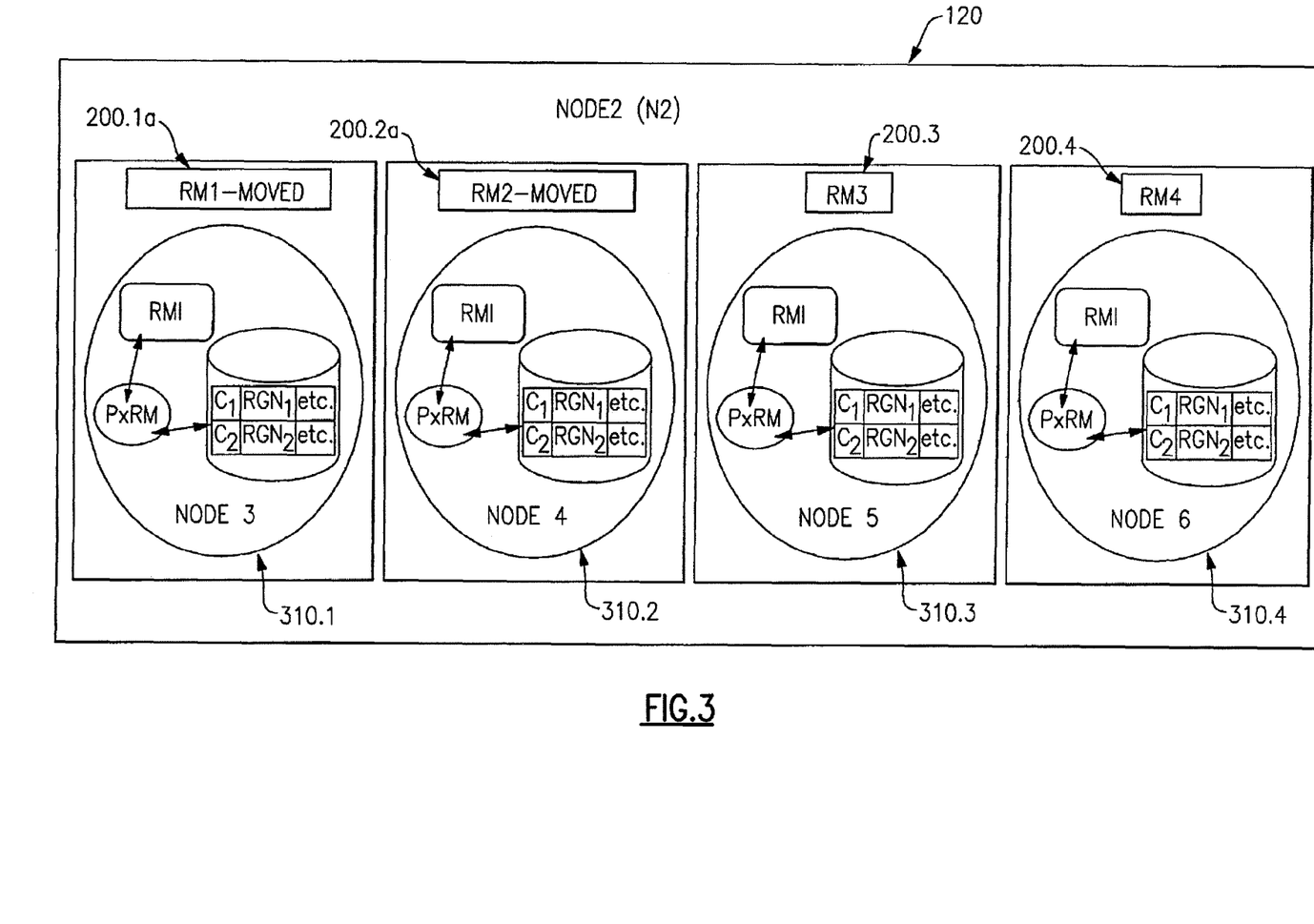
FIG. 3 shows an enlarged portion of FIG. 2 illustrating in greater detail the structure of information maintained in a non-remote node, that is, in an intermediate node which includes a RMI and which runs a proxy resource manager for remote-resources.

FIG. 3 illustrates the relation between connected components referred to collectively by reference numerals 310.1-310.4, or more generically by reference numeral 310.x in FIG. 4, where for purposes of illustration and discussion it may be assumed that "x" in 310.x ranges from 1 to 4, and similarly for 320.x, 325.x, 330.x, 340.x and 350.x, and elsewhere herein. In particular, 310.x refers to a node in a failover group. These nodes include proxy resource managers 330.x which communicate with proxy resource agents 430.x on remote nodes 400.x. A significant aspect of the present invention is the retention in persistent memory 320.x of a table of entries 325.x for each remotely managed resource $C_i$, as shown in FIG. 5. Table 325.x is kept in synchronization through communications between proxy resource managers (PxRMs) 330.x residing in nodes 3 through 5 (in the present illustrative example) and proxy resource agents (PxRAs) residing in remote nodes 400.1 through 400.x (where here, for illustrative purposes only x is 4). Synchronization is made possible through the use of Resource Generation Numbers (RGNs) whose modification and characteristics are described elsewhere herein. Table 325.x includes an entry for each remotely managed resource. There is an entry identifying the resource by name and an entry that indicates its currently assigned RGN. Further entries are provided in Table 325.x which indicate resource status and (as needed) resource specific information. The structure of Tables 325.x and 425.x (see FIG. 5) are essentially the same. However, there may exist, from time to time, differences in the RGN entries, such as those which occur when a failed node returns to service. There may also be differences that exist when a managing node opts to drop a remote resource from its list of supported entries. At a managing node proxy resource manager (PxRM) 330.x communicates with a local Resource Manager 350.x through a consistently defined Resource Management Interface 340.x. Also at a managing node it is noted that persistent storage 320.x may include a disk drive, an optical drive, a tape drive or even random access memory. Its most important feature is persistence as opposed to the stricter criterion of non volatility.

At a remote node complex such as 400.x, which includes remote node 405.x together with remote resources $C_1$, $C_2$, ..., $C_m$ (411.x, 412.x, ..., 41m.x, respectively), proxy resource agent (PxRA) 430.x maintains Table 425.x which, under ideal circumstances, is a duplicate of locally maintained Table 325.x. PxRA 430.x communicates directly with PxRM 330.x for purposes of communicating the RGN entries and for comparing them to insure remote resource status consistency. Remote resources $C_1$, $C_2$, ..., $C_m$ communicate with node 405.x through node interface 435.x which is also used by proxy resource agent PxRA 430.x for communications with the resources. Node interface 435.x is simply meant to refer to the mechanism for communication between a remote resource and the node to which it is directly attached. It does not form a part of the present invention.

It is noted that even though the figures and description herein are primarily directed to the actions and capabilities associated with a single failover node group, the present invention contemplates, permits and suggests that any reasonable number of failover groups may be defined and employed and that overlapping coverage is permitted so as long as reference is made to RGN information stored and maintained at remote notes, preferably through the use of proxy resource agents which pass this and related status information back to a proxy resource manager.

A Resource Generation Number is unique in time per the resource. In other words, two RGNs are different if they are created at the different times. This property guarantees there is no state ambiguity in determining whether a Resource Generation Number changed or not. Hence a Resource Generation Number is preferably something as simple as a time stamp. However, it is noted that the Resource Generation "Number" may in general include any indicia which is capable of having an order relation defined for it. Integers and time stamps (including date and time stamps) are clearly the most obvious and easily implemented of such indicia. Accordingly, it is noted that reference herein to RGN being a "number" should not be construed as limiting the indicia to one or more forms of number representations. Additionally, it is noted that where herein it is indicated that the RGN is incremented, there is no specific requirement that the increment be a positive number nor is there any implication that the ordering or updating of indicia has to occur in any particular direction. Order and comparability are the desired properties for the indicia. Time stamps are merely used in the preferred embodiments.

As used herein, when it is indicated that a node has failed, this means either that communications to and/or from the node are no longer happening or that there is an internal node problem. The failure of a node due to communications problems tends to be more temporary and/or shorter lasting in duration. These failures tend to arise because of a problem with a communications adapter. However, communication problems are sometimes solvable through the identification and use of alternative communication paths. With respect to internal node problems, which tend to be more severe in nature, restarting the node or rebooting the node often solves the problem, but in such cases RGN's are reset to zero (or an equivalent) as well. These changes in status are recognized by the PxRM's of the present invention.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for managing a remotely accessible resource in a multi-node, distributed data processing system, said method comprising the steps of:

running a proxy resource manager on a plurality of nodes of said distributed data processing system and storing therein, in persistent storage devices coupled to respective ones of said plurality of nodes, a sequential resource generation identifier which is associated with said remotely accessible resource;

running a proxy resource agent on at least one other node and maintaining therein a local version of said sequential resource generation identifier associated with said resource together with a status for said resource;

incrementing said persistently stored identifier upon restart of a corresponding one of said plurality of nodes;

incrementing said local identifier version, via said proxy resource agent, upon change in resource status; and comparing said local and said persistent identifiers for said resource to insure consistency of said status of said resource.

* * * * *